Nov. 29, 1960  P. F. WILBER  2,962,121
FILTER
Filed March 26, 1958  2 Sheets-Sheet 1
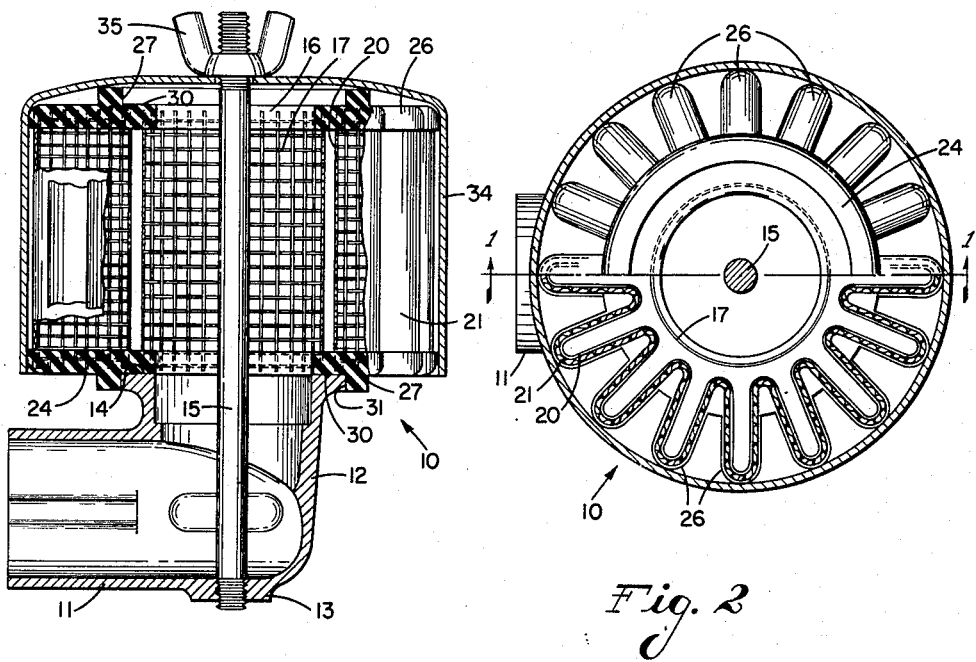
Fig. 1
Fig. 2
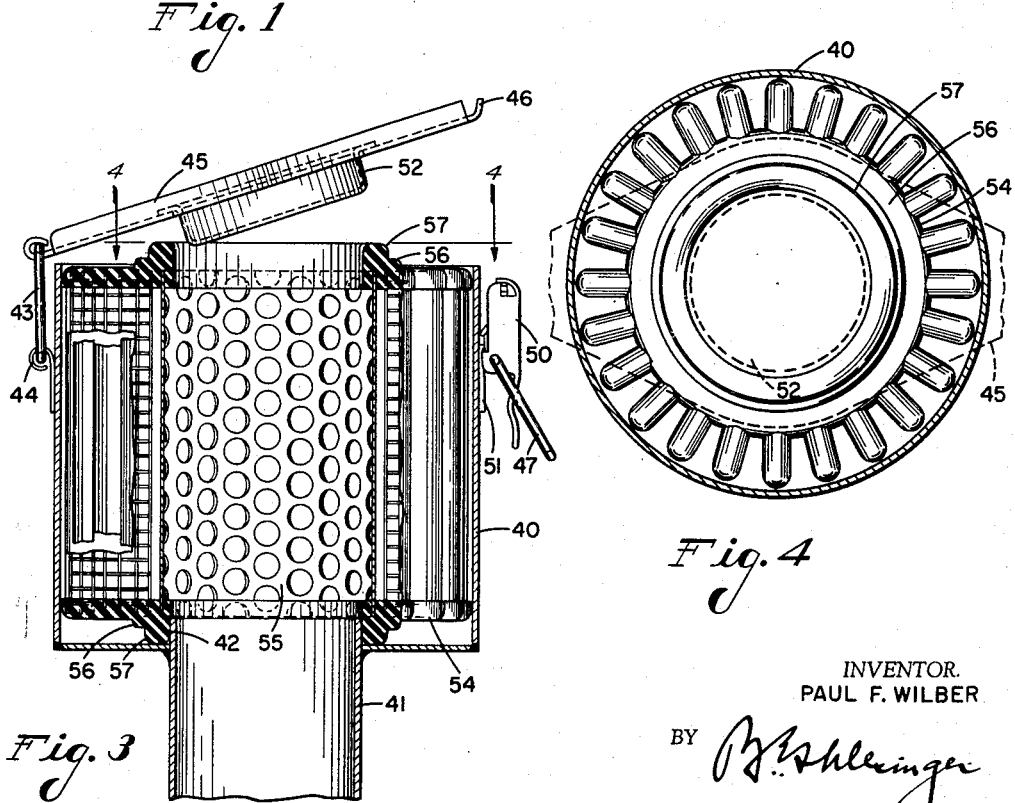
Fig. 3
Fig. 4
INVENTOR.
PAUL F. WILBER
BY
ATTORNEY

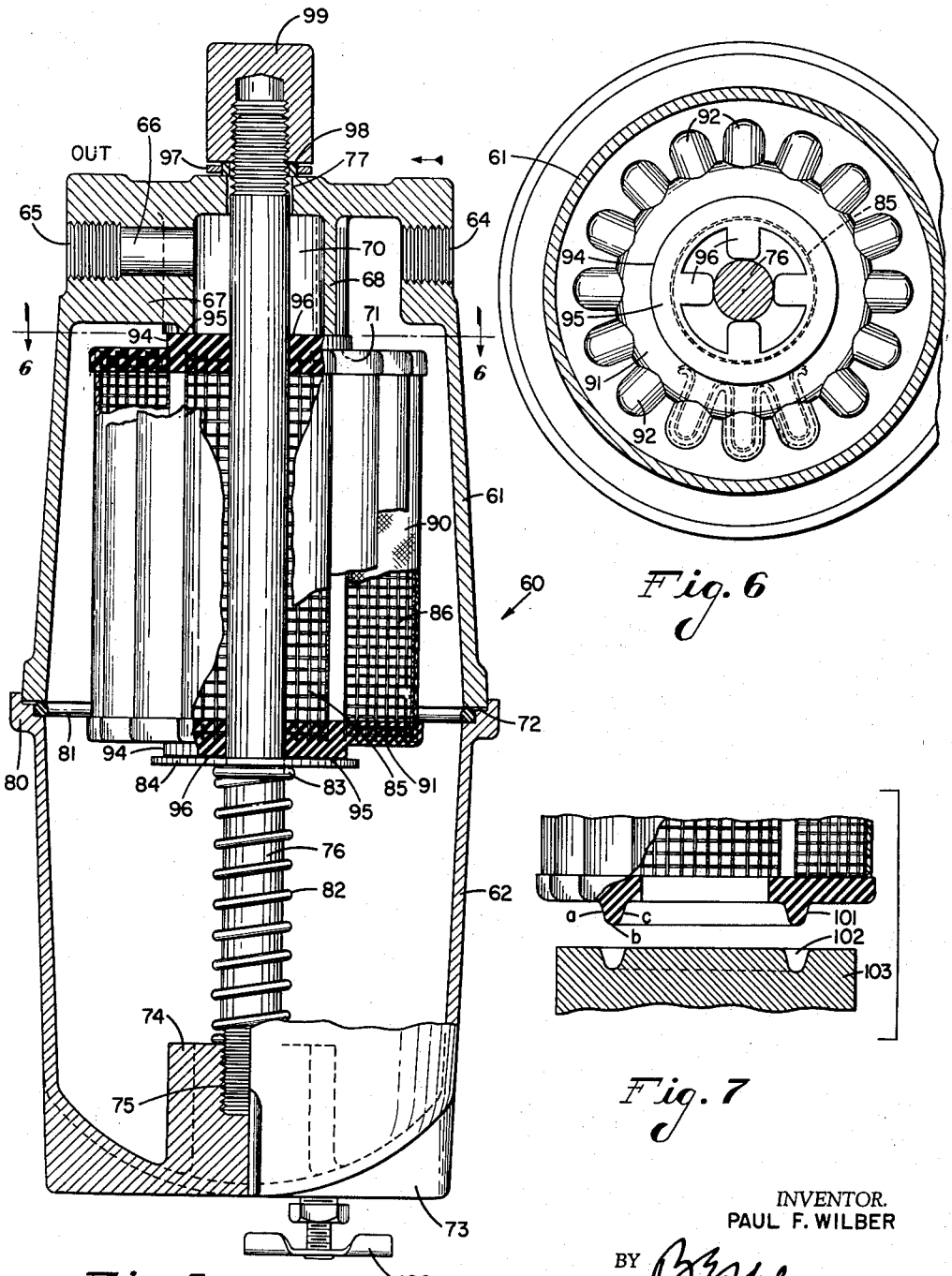

United States Patent Office 2,962,121
Patented Nov. 29, 1960

2,962,121

FILTER

Paul F. Wilber, Richland, N.Y., assignor to Dollinger Corporation, Rochester, N.Y., a corporation of New York Filed Mar. 26, 1958, Ser. No. 724,016

17 Claims. (Cl. 183—71)

The present invention relates to filters, and more particularly to filters employing replaceable cartridges having pleated or fluted filter elements.

Heretofore, in this type of filter cartridge, the pleated or fluted filter element has been held in pleated condition by disc-shaped caps at opposite ends of the filter element. In some cases the end caps are metallic. Gaskets are then interposed between the ends of the filter elements and the end caps to seal the filter elements with relation to the end caps. Recently, in some instances the end pieces have been formed from vinyl plastisols, and the ends of the pleated filter element have been embedded therein to seal the filter element to the end caps.

Aside from the problem of sealing the end caps to the filter element there exists, for some types of filters, the problem of securing and centering the filter cartridge relative to the casing in which it is mounted. Conventionally the cartridge may be secured in the filter casing by a bolt and nut, and centering may be effected by some part which is coaxial with the bolt and which engages in the filter element.

It is difficult to seal the filter elements which have metallic end caps. The filter elements having plastic end caps are expensive. Both types are difficult to clean and to maintain efficient.

One object of the present invention is to provide a filter cartridge having a pleated filter element and that is less expensive, and more efficient than cartridges of previous constructions.

Another object of the invention is to provide a filter insert of the character described that can be cleaned more easily than conventional such filter inserts.

Another object of the invention is to provide a filter cartridge of the character described that in some uses will be self-cleaning.

A further object of the invention is to provide a filter cartridge of the character described that will permit the use of smaller casings than heretofore required for such cartridges.

Another object of the invention is to provide a filter cartridge of the character described in which the pleats or flutes of the filter elements are securely positioned and held in substantially equiangularly spaced relation.

Another object of the invention is to provide a filter having a replaceable cartridge of the character described in which the cartridge carries the means by which it is centered.

Other objects of the invention will be apparent hereinafter from the specification and from the recital of the appended claims.

In the drawings:

Fig. 1 is a section taken generally on the line 1—1 of Fig. 2 looking in the direction of the arrows and showing a filter containing a replaceable cartridge made according to one embodiment of this invention mounted on the air-intake pipe of an internal combustion engine, part of the filter cartridge itself being shown in elevation;

Fig. 2 is a horizontal section through the filter of Fig. 1, half of the filter cartridge being shown in plan and the other half being shown in horizontal section;

Fig. 3 is a part axial section, part elevation, of another type of filter containing a modified form of filter cartridge constructed according to the invention;

Fig. 4 is a top plan view thereof, with the cap of the filter shown in dotted lines in its closed position;

Fig. 5 is a part elevation, part axial section of a pipeline filter constructed according to another embodiment of the invention;

Fig. 6 is a fragmentary section taken on the line 6—6 of Fig. 5 looking in the direction of the arrows, and indicating by dotted lines in one of the end pieces of the cartridge the contour of a part of the pleated filter element on which the end pieces are molded; and Fig. 7 is a fragmentary part elevation, part section of still another embodiment of the invention, with a few of the fins or pleats of the filter insert shown partly in elevation.

Referring now in detail to the drawings, 10 denotes an air intake filter that can be mounted directly on, for example, the air intake pipe 11 of an internal combustion engine. The pipe 11 has an upwardly directed section 12 that is formed at its upper end with a horizontal seat 14.

A filter insert 16, of the radial fin type, constructed according to one embodiment of this invention, is mounted on the upper end of the pipe section 12. The filter insert 16 comprises a cylindrical inner screen 17 that is formed of finely woven wire, and an outer screen 20 that is also made of finely woven wire, and that is formed with radially-directed and axially-extending pleats. The radially inner ends of the pleats and slightly radially spaced from the inner screen 17; the distance is exaggerated in the drawings for clarity.

A porous filter element 21, such as, for example, felted cloth, is mounted on the outer screen or frame member 20 and covers both sides of the pleats to form an unbroken, conforming cover for the outer frame member.

A pair of end caps or members 24 are molded on the ends of the frame members. Each end cap 24 is formed with a plurality of integral fingers 26 that are radially extended outward from the hub. The ends of the screen cylinder 17 are embedded in the end caps 24 respectively. The ends of the pleats and the filter element are embedded in the fingers 26. The screens 17 and 20 respectively are embedded in the end caps 24 nearly the full thickness of the respective end caps 24, as best shown in Fig. 1, to reinforce and rigidify the end caps.

The end members 24 may be formed from any readily moldable elastomeric composition. One preferred moldable composition is a plastisol of polyvinyl chloride. However, many other moldable elastomeric compositions can also be used.

The end members 24 are formed in substantially identical shape but are inverted with respect to each other. Each end cap is formed with an annular boss 27 and with a plane seating surface 30 that is recessed axially of the boss 27, to provide an annular cylindrical surface or centering shoulder 31.

The plane seating surface 30 on the lower end cap of the filter insert is engaged against the plane seating surface 14 of the pipe section 12, and the pipe section 12 is engaged against the cylindrical surface 31 to center the insert on the pipe section 12 and about the rod 15, which is threaded at both ends and which projects upwardly through the bore of the insert. The rod 15 is threaded at its lower end in the boss 13 on the pipe 11. An inverted, generally cup-shaped housing 34 is mounted over the filter insert 16. The housing 34 is formed with an opening in its end face, through which the upper end of the rod 15 projects. A double wing nut 35 threads onto the projecting upper end of the rod 15 to hold the housing 34 on the rod 15 and over the filter insert 16, and to hold the insert 16 against the seat 14 of the fitting section 12.

In Fig. 1, the parts are shown in assembled relation, but the nut 35 must be tightened to place the filter in condition for operation. When the nut 35 is tightened, the end face of the weather housing 34 is pressed against the boss 27 to compress it and form a fluid-tight seal; and pressure is exerted on the lower end cap 24 to form a fluid-tight seal between its recessed seating surface 30 and the seat 14 of the pipe section 12.

The insert 16 is reversible end for end. The boss 27 functions as a gasket at the top of this intake filter, and at the bottom it is a centering means.

One end cap 24 may be molded by pouring the polyvinyl chloride plastisol in a suitable mold, placing the cloth-covered outer frame and the inner frame on top and penetrating into the plastisol under their own weight, then curing the plastic. The second end cap can then be formed by removing the partly-completed insert from the mold, reversing it, and repeating the process.

In operation of the filter, air is drawn through the open lower end of the housing through the spaces between the fingers 26 of the lower end cap, which constitute an inlet port, through the pleated filter element 21, through the foraminous frames 20, 17, and the lower end of the bore of the filter element, which constitutes an outlet port, into the bore of the pipe 11. Dirt is retained on the filter element 21.

Referring now to the second embodiment of the invention shown in Figs. 3 and 4, 40 denotes the housing of a heavy-duty air intake filter. The housing 40 is generally cup-shaped, and its end face is formed with a circular opening in which a pipe 41 is welded coaxial with the housing. A short portion 42 of the pipe 41 projects into the interior of the housing. The pipe 41 is adapted to be connected to an air intake line or manifold.

A filter insert 54 of the radial fin type is mounted in the housing. The insert 54 is generally of the same construction as the insert previously described, with two exceptions. First, the inner frame member 55 is formed from a perforated metal tube rather than from woven metal wire, because of the strength requirements of this particular filter. Secondly, the end caps or members 56 are molded with annular bosses 57 that have curved seating surfaces. The bore of the insert 54 and the outside diameter of the projecting end 42 of the pipe 41 are so proportioned that a fluid-tight seal is obtained when the insert is forced over the end 42 of the pipe 41.

A clip 43 is pivotally mounted on a bracket 44 at one side of the housing 40, and a cap 45 is pivotally secured to the clip 43, for movement across and away from the open upper end of the housing. At its free end, the cap 45 is formed with an upturned lip or catch 46. On the side of the housing diametrally opposite the clip 43, a second clip 47 is pivotally mounted at one end of a clamp 50, the other end of which is pivotally mounted on a bracket 51 that is welded to the housing. The cap 45 is formed with a generally cylindrical boss 52 that is disposed to be coaxial with the housing 40 and with the pipe 41 when the cap 45 is fastened across the open end of the housing.

To assemble this filter for operation, the filter insert 54 is placed in the housing 40 and is forced over the projecting end 42 of the pipe 41. Pressure is required to press the insert 54 down over the projecting pipe end 42, to engage the cylindrical surface of the boss 57 around the pipe end 42 and the curved surface of the boss 57 against the end face of the housing 40. The cap 45 is then swung across the open end of the housing to engage the boss 52 within the bore of the boss 57 of the upper end cap of the insert. The cap 45 is then pressed down manually into the cylindrical surface of the boss, and the rocker link 50 is pivoted up until the clip 47 can be engaged behind the lip 46 of the plate. Then, the rocker link 50 is snapped down to force the boss 52 into the cylindrical bore of the end cap 56 and to engage the curved seating surface of the boss 57 against the underface of the cap 45.

In this filter, a fluid-tight seal is formed in two places at each end of the filter insert. One fluid-tight seal is formed at each end of the filter insert between the male member that projects into the bore of the boss 57, and the confronting cylindrical wall of the boss. The second fluid-tight seal is formed at each end, between the curved seating surface of the boss 57 of each end cap, and the smooth face of the metal housing or cap against which it is engaged. The housing and the insert are proportioned so that the axially-projecting bosses 57 are subjected to sufficient axial compression at each end to form the fluid-tight seal. In this filter, the insert is reversible endwise, as in Figs. 1 and 2.

In operation of this air intake filter, air is drawn through the open end of the housing 40, which constitutes a first, inlet port, around the cap 45, between the fins of the filter insert 54, through the cloth filter element and the frame members, and into the interior of the insert, and thence downwardly through the lower end of the bore of the insert, which constitutes an outlet port, into the pipe 41. Dirt is caught and retained on the filter cloth.

Referring now to the embodiment of the invention shown in Figs. 5 and 6, 60 denotes a generally cylindrical pipeline filter that has a housing formed from mating, generally cup-shaped, upper and lower housing halves 61 and 62, respectively. The upper half 61 of the housing is formed with axially-aligned threaded inlet and outlet ports 64 and 65, respectively, for connecting the filter in a pipeline.

The inlet port 64 communicates with the hollow interior of the upper half 61 of the housing. The outlet port 65 communicates with the bore 66 of a boss 67 that is formed integrally in the upper half 61 of the housing and whose bore 66 extends radially of the upper half of the housing and is axially aligned with the inlet port and the outlet port 65. The upper half 61 of the housing is also formed on its interior face with an integral, axially-extending tubular portion 68 with which the boss 67 is integrally united, and the bore 66 of the boss 67 opens into the chamber 70 in the tubular portion 68. The lower end face of the tubular member 68 is formed as a plane seating surface 71. The lower end face of the upper half 61 of the housing is also formed as a plane seating surface 72.

The lower half 62 of the housing is formed on its end face with exterior reinforcing ribs 73 and with an interior, integrally-cast cylindrical boss 74 that is formed with a threaded bore 75 that is generally coaxial with the lower half 62 of the housing. A rod 76 that is threaded at its ends is screwed into the bore 75 and extends axially up through the interior of the filter housing to project through an opening 77 in the end face of the upper half 61 of the housing.

The lower half 62 of the housing is formed with a shouldered flange 80 in which the upper half 61 of the housing is received. The shouldered flange 80 is stepped inwardly to provide a seat for an O-ring 81 that is compressed when the filter is assembled to form a fluid-tight seal between the halves of the housing.

A coil spring 82 is mounted around the lower end of the rod 76 and engaged against the boss 74. The spring 82 is formed at its upper end with a substantially smooth surface on which an O-ring 83 is engaged. A flat metal washer 84 is mounted on the rod 76 and engaged on the upper surface of the O-ring 83.

A filter insert of the radial fin type is mounted on the rod 76, with its lower end engaged against the washer 84. The filter insert is generally similar in construction to those previously described, but the end caps are formed differently and it is of larger size. The filter insert comprises a cylindrical inner frame member 85 that is formed of woven wire, and an outer frame member 86 that is also made of woven wire and that is formed with radially-directed and axially-extending pleats. The radially inner ends of the pleats are slightly radially spaced from the inner frame member 85. A cloth filter element 90 is mounted on the outer frame member and covers the pleats on both sides to provide an unbroken, conforming cover.

A pair of end caps 91 are molded on the ends of the frame members and each has a plurality of radially-extending, integral fingers 92. The ends of the cylindrical inner frame member 85 are embedded in the end caps 91, and the fingers 92 are associated respectively with the pleats. Each finger 92 has the end of its associated pleat, including the end of the cloth filter element, embedded within it.

Each end cap 91 is molded with an axially-projecting boss 94 that is generally cylindrical and that is formed at its end with a plane end face 95. Each end cap 91 is also formed with a plurality of integral, inwardly-projecting centering lugs 96 that engage against the rod 76 to center the filter insert about the rod and within the filter housing. This insert is also reversible, end for end.

At the lower end of the insert, the end face 95 of the boss 94 is engaged in fluid-tight relation against the metal disc 84, and the disc 84 is in turn engaged in fluid-tight relation against the O-ring 83, to prevent any passage of fluid into or out of the filter insert between the centering lugs 96 at the lower end of the filter insert. At the upper end of the filter insert, the end face 95 of the boss 94 on that end cap is engaged in fluid-tight relation against the plane seating surface 71 at the lower end of the tubular portion 68.

To hold the filter parts together in operative relation, a metal washer 97 that has a compressible rubber sleeve insert 98 is placed over the end of the rod 76 that projects through the opening 77 in the end face of the upper half of the filter housing, and a nut 99 is threaded onto the end of the rod. The nut 99 is tightened to compress the sleeve insert 98 of the washer 97 to form a fluid-tight seal between the nut 99 and the filter housing.

The parts of the filter assembly are proportioned so that the coil spring 82 constantly urges the O-ring 83 against the lower face of the metal disc 84, to compress the O-ring 83 and to press the metal disc 84 against the plane end face 95 of the boss 94 on the lower end cap of the filter insert, to compress the boss and form a fluid-tight seal. Similarly, the coil spring 82 constantly exerts pressure through the frame of the filter insert, to press the plane surface 95 on the boss 94 at the upper end of the filter insert against the plane seating surface 71 of the tubular portion 68.

A drain cock 100 is mounted in the end face in the lower half 62 of the housing, to permit periodic draining of the filter housing.

In operation of this filter, a fluid such as compressed air or oil enters the filter housing through the inlet port 64. The fluid impinges against the tubular portion 68 and is deflected outwardly against the wall of the housing and downwardly. Large particles of dirt can drop down and accumulate at the bottom of the housing. The fluid passes through the filter element 90 and any entrained solids are retained on the outer surface of the filter element. After passing through the filter element 90, the fluid passes through the frame members 86, 85, of the filter insert, and upwardly through the spaces between the centering lugs 96 of the upper end cap, which constitute an outlet port, into the chamber 70 of the tubular portion 68, then through the bore 66 of the boss 67, and then out through the outlet port 65.

In the modified form of the invention illustrated fragmentarily in Fig. 7, a filter insert and seat construction is illustrated that provide three seals at each end of the filter insert. Each end cap of the filter insert is formed with an axially projecting boss 101 that is adapted to be engaged in a recess 102 in a closure member 103. The boss 101 and the recess 102 are so proportioned that the recess 102 is smaller in all directions than the boss 101, so that when the boss 101 is pressed into the recess 102 upon assembly of the filter, the boss 101 will be compressed, and fluid-tight seals will be formed between the surfaces $a$, $b$, $c$ of the boss 101 and the confronting surfaces of the recess 102.

In the foregoing embodiments of the invention, the construction of the filter insert affords manufacturing economies since the quantity of vinyl plastisol, or other elastomeric moldable material, that is used to form the end caps, is at a minimum. Since the fingers in each case are molded integrally with the end caps of the filter insert, and with the frame pleats embedded therein and extending nearly through the entire thickness thereof, a remarkably strong structure is obtained. Moreover, the fins or pleats are held in equiangularly spaced relation for uniform and efficient performance.

Any dirt that becomes dislodged from the filter element is free to drop between the fingers of the lower end cap, so that the dislodged dirt will not accumulate on the end cap and interfere with filter performance. This is a particular advantageous feature of the invention when the filter is installed in a location where it is subjected to vibration or jarring that will tend to dislodge the dirt that has been retained on the filter element. This feature is particularly advantageous when the filter insert is customarily cleaned without disassembling the filter, by blowing compressed air into the filter through the outlet port. This type of cleaning is more effective with the filter inserts of this invention, because the dirt that is blown away from the filter element does not accumulate to obstruct filter performance, as is the case where solid end caps are used.

Another advantageous characteristic of filter insert construction according to this invention, that is attributable to the use of end caps with discrete fingers at the ends of the pleats, is that the filter housing need only be large enough to accommodate the filter insert; whereas, with solid end caps, radial spacing is required between the periphery of the insert and the housing to permit fluid flow around the solid end caps. This advantage is particularly evident, for example, in the filter illustrated in Fig. 2, where the housing engages against the ends of the fingers; if solid end caps were employed, a space of considerably larger size would be required between the solid end members and the housing to permit air to pass around the solid end members.

The use of centering lugs that are molded as an integral part of the end members is also advantageous, for pipeline filters such as that illustrated in Figs. 5 and 6. Similarly, the use of the bosses on the end caps to center the insert facilitates assembly of filters. When the bosses are used, as in Figs. 3 and 4, both for centering and for providing two separate sealing surfaces at each boss, or for providing three separate sealing surfaces at each boss, as in Fig. 7, even further advantages accrue from this invention.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus descried my invention what I claim is:

1. A filter insert of the radial fin type comprising a porous filter element that is symmetrical about a central axis and that is formed with radially-disposed, axially-extending pleats, a pair of elastomeric end members molded on the opposite ends, respectively, of said elements, each end member having a plurality of separate, radially-extending fingers integral therewith, each finger being associated with a pleat, and said pleat being embedded therein.

2. A filter insert of the radial fin type comprising a porous filter element that is symmetrical about a central axis and that is formed with radially-disposed, axially-extending pleats, a pair of elastomeric end members molded on the ends, respectively, of said element, each said end member having a plurality of separate, radially-extending fingers integral therewith, each finger being associated with a pleat and said pleat being embedded therein, said end members having coaxial central bores and portions coaxial with the bores and spaced radially outwardly therefrom to provide means for centering said element on a support therefor.

3. A filter insert of the radial fin type comprising a porous filter element that is symmetrical about a central axis and that is formed with radially-disposed, axially-extending pleats, a pair of elastomeric end members molded on the opposite ends, respectively, of said element, said end members having a plurality of separate, radially outward extending fingers integral therewith, each finger being associated with a pleat and said pleat being embedded therein, and said end members also having coaxial bores and a plurality of integral, resilient, lugs radially inwardly extending into said bores for centering said insert radially on a support therefor.

4. A filter comprising a housing, a filter cartridge mounted in the housing and comprising a porous filter element that is symmetrical about a central axis and that is formed with radially-disposed, axially-extending pleats, a pair of elastomeric end members molded on the opposite ends, respectively, of said element, each end member having a plurality of separate, radially-extending fingers integral therewith, each finger being associated with a pleat and said pleat being embedded therein, said housing having a first port therein for admitting a fluid to said housing to the exterior of said cartridge, and a duct secured to said housing and connected with the interior of said element and through which fluid can exhaust from the interior of said cartridge and from said housing.

5. The filter of claim 4 in which said housing has a wall surrounding said filter element and contacting the peripheral, terminal ends of the fingers of both said end members.

6. The filter of claim 5 in which the housing has an opening at one end to provide said first port, and in which said opening communicates with the space between said fingers.

7. A filter as claimed in claim 6 in which said end members have bores and centering surfaces spaced radially outwardly of said bores, and in which said duct communicates with the bore of one, at least, of said end members, and in which said one end member has fluid-tight engagement with said duct.

8. A filter comprising a housing, supporting means, a bolt for holding said housing on said supporting means, a filter insert of the radial fin type mounted in the housing and comprising a porous filter element having an axis of symmetry and radially-disposed, axially-extending pleats, a pair of elastomeric end members molded on the opposite ends, respectively, of said element, each end member having a plurality of separate radially extending fingers integral therewith, each finger being associated with a pleat and said pleat being embedded therein, said end members having coaxial bores and integral, radially inwardly-extending centering lugs for engaging said bolt to center said insert radially in said housing, said housing having an inlet port for admitting fluid to said housing and to the exterior of said cartridge, and a duct connected to said housing and communicating with the interior of said element and through which fluid can flow outwardly from the interior of said cartridge and from said housing.

9. In combination, a casing, a filter insert of the radial fin type that has radially-disposed, axially-extending pleats, a pair of elastomeric end members molded on the opposite ends, respectively, of said insert, each end member having a plurality of separate, radially extending fingers integral therewith, each finger being associated with a pleat and said pleat being embedded at one end therein, said end members having integral, axially-projecting, compressible bosses providing seating surfaces and also having axially-aligned centering surfaces, said casing having an inlet port for supplying fluid to the exterior of said insert, means engageable on a centering surface of one end member and in fluid-tight relation against the boss of said one end member to center the insert radially in said casing and to close said insert at that end, and a tubular conduit engaging in the centering surface of the opposite end member with its bore in communication with the interior of said insert, and a support for said insert secured to said conduit in fluid-tight relation against the boss of said opposite end member, whereby said casing and insert exhaust through said conduit.

10. The combination with a filter comprising a generally cup-shaped housing, and a filter insert of the radial fin type mounted in said housing and comprising a porous filter element that has radially-disposed, axially-extending pleats, a pair of elastomeric end members molded on the opposite ends, respectively, of said element, each end member having a plurality of separate, radially-extending fingers integral therewith, each finger being associated with a pleat and said pleat being embedded at one end therein, said end members having coaxial bores and having compressible plane seating surfaces at right angles to the axis of said bores and cylindrical centering surfaces radially-spaced from said bores of a tubular support member engaging a plane seating surface and the cylindrical centering surface of one end member to communicate with the interior of the insert to provide an exhaust duct therefor and to center the insert thereon, the end of said housing engaging a plane seating surface of the other end member, and means securing said tubular support member, insert, and housing together and pressing said tubular support member and housing respectively against the plane seating surfaces of the respective end members, that they engage, in fluid-tight relation.

11. A filter comprising a cup-shaped casing, a filter insert of the radial fin type disposed in said casing and comprising a porous filter element having radially-disposed, axially-extending pleats, a pair of elastomeric end members molded on the opposite ends, respectively, of said element, each of said end members having a plurality of separate, radially-extending fingers integral therewith, each finger being associated with a pleat and the adjacent end of said pleat being embedded therein, said end members having coaxial bores, said bores providing radial centering surfaces for centering said element in said casing, the outer end faces of said end members having integral, axially compressible bosses providing seating surfaces, and said casing having an inlet port for admitting fluid to said casing and to the exterior of said insert, a tubular member in said casing engageable in the bore of one end member in fluid-tight relation to place said tubular member in communication with the interior of the insert to form an exhaust duct therefor, to permit fluid to flow outwardly from the interior of said insert and from said casing, said casing having an end wall adjoining said tubular member and engaging in fluid-tight relation against the boss of said one end member, and means connected to said casing and engaging in the bore and against the boss of the other end member to center the insert radially at that end.

12. The combination with a filter comprising a cup-shaped casing formed with an open upper end providing an inlet port for admitting fluid to said casing, and a filter insert of the radial fin type disposed in said casing and comprising a porous filter element having axially-extending pleats, a pair of elastomeric end members molded on the opposite ends, respectively, of said element, each of said end members having a plurality of integral, separate, radially extending fingers each of which is associated with a pleat, the adjacent end of said pleat being embedded therein, said inlet port communicating with the spaces between said fingers, said end members having coaxial bores providing centering surfaces for said insert, of a tubular member mounted at the lower end of said casing and engaged in fluid-tight relation in the bore of the lower end member of said insert to communicate with the interior of said insert to form an exhaust duct therefor and to center said insert radially in said casing, said casing having a bottom end wall adjoining said tubular member and engaging in fluid-tight relation against the boss of said lower end member, closure means secured to the upper end of said casing and resiliently engaged in fluid-tight relation in the bore and against the boss of the upper end member to center the insert radially and to close the bore at that end, said closure means also resiliently pressing together the bottom end wall of said casing and the lower end members of said insert.

13. A filter comprising a casing having an open upper end providing an inlet port for admitting fluid to said chamber, and a filter insert of the radial fin type disposed in said casing and comprising a porous filter element that has radially disposed, axially-extending pleats, a pair of elastomeric end members molded on the opposite ends, respectively, of said element, each end member having a plurality of separate, radially-extending fingers integral therewith, each finger being associated with a pleat, said pleat being embedded at one end therein, said inlet port communicating with the spaces between said fingers, said end members having bores providing centering surfaces, said end members having axially-projecting, compressible bosses providing axial seating surfaces, a tubular member mounted at the lower end of said casing and projecting into said casing at one end thereof and communicating with the interior of said insert to form an exhaust duct therefor, the boss of the lower end member being engaged around said tubular member in fluid-tight relation to center said insert in said chamber, said casing having a bottom end wall adjoining said tubular member and engaging in fluid-tight relation against the seating surface on the boss of said lower end member, a cap pivotally mounted on the upper end of said casing and formed with a boss engageable in the bore of said upper end member in fluid-tight relation to close the bore of said upper end member and to center the insert at that end, and means resiliently to hold said cap with its boss engaged in the bore of said upper end member and constantly to urge said cap axially toward the bottom end wall of said casing to engage the seating surfaces on the bosses of said end members, respectively, against the casing and the cap, respectively, resiliently and in fluid-tight relation.

14. A filter comprising a casing having an inlet port for admitting fluid thereto, a filter insert of the radial fin type disposed in said casing and comprising a porous filter element that is formed with radially-disposed, axially-extending pleats, a pair of elastomeric end members molded on the opposite ends, respectively, of said element and having bores that are coaxial with said insert, each end member having a plurality of separate, radially extending fingers integral therewith, each finger being associated with a pleat, said pleat being embedded at one end therein, each of said end members having an axially projecting, compressible boss providing an axial seating surface, each of said end members also having a plurality of integral, angularly-spaced bearing members that extend radially inwardly in said bores, a rod secured at least at one end thereof to said casing and axially projected through said insert, said bearing members engaging said rod to center said insert in said chamber, closure means engaged against the seating surface of one of said end members to close said insert at that end, and a tubular member engaged against the seating surface at the opposite end in communication with the interior of said insert, an outlet duct connected to said casing and so disposed that the bore of said tubular member communicates with said outlet duct to permit fluid to flow outwardly from the interior of said insert, and means resiliently securing said insert on said rod and constantly urging said tubular member and said closure means against the seating surfaces, that they engage, in fluid-tight relation.

15. A filter comprising a housing, a filter insert of the radial fin type disposed in said housing and comprising a porous filter element that is symmetrical about a central axis and that is formed with radially-disposed, axially-extending pleats, a pair of elastomeric end members molded on the ends of said element, respectively, each end member having a bore coaxial with said filter element, a plurality of separate, radially-extending fingers integral therewith, and an integral, axially-projecting boss, said pleats being embedded at opposite ends in axially-aligned fingers, each said boss having sides converging to its top and being compressible axially and radially, said housing having recesses in which said bosses are engaged, each said recess being smaller in all dimensions than the associated boss, and means for applying pressure to said end members to compress said bosses in said recesses to form fluid-tight seals at radially-spaced locations on each boss and at the top of each boss, said housing having a first port therein for admitting a fluid to said housing and to the exterior of said cartridge, and a duct secured to said housing and communicating with the bore of at least one end member and through which fluid can exhaust from the interior of said cartridge and from said housing.

16. A filter insert of the radial fin type comprising a perforate cylindrical inner screen, an outer screen of finely woven wire surrounding said inner screen and formed with a plurality of radially-disposed, axially-extending pleats, the radially inner ends of which are spaced radially from said inner screen, a porous filter element mounted on said outer screen and covering both sides of said pleats to form an unbroken, conforming cover for said outer screen, and a pair of elastomeric end members molded on the top and bottom ends, respectively, of said screens and filter element, each of said elastomeric end members comprising a central ring portion and a plurality of radially-extending fingers integral with said ring portion, each finger being associated with a pleat and said pleat being embedded at top and bottom in the associated fingers.

17. The combination with a filter comprising a housing, and a filter cartridge of the radial fin type mounted in said housing and comprising a porous filter element that is symmetrical about a central axis and that is formed with radially-disposed, axially-extending pleats, a pair of elastomeric end members molded on the opposite ends, respectively, of said element, each end member having a plurality of separate, radially-extending fingers integral therewith, each finger being associated with a pleat and said pleat being embedded at one end therein, said end members having coaxial bores, one of said end members, at least, having a compressible seating surface on its external end face, and one of said end members, at least, having an annular centering surface coaxial with said bores, of supporting means secured to said housing and engaging said seating surface and said centering surface to center said filter element in said housing, said housing having a first port therein for admitting a fluid to said housing to the exterior of said element, and a second port in said housing connected with the interior of said element and through which fluid can exhaust from the interior of said element and from said housing.

References Cited in the file of this patent

UNITED STATES PATENTS

| | | |
|---|---|---|
| 2,732,031 | Rabbitt et al. | Jan. 24, 1956 |
| 2,871,976 | Sebok | Feb. 3, 1959 |

FOREIGN PATENTS

| | | |
|---|---|---|
| 329,099 | Great Britain | May 15, 1930 |
| 680,211 | Great Britain | Oct. 1, 1952 |
| 720,193 | Great Britain | Dec. 15, 1954 |
| 754,496 | Great Britain | Aug. 8, 1956 |
| 491,730 | Italy | Mar. 11, 1954 |
| 162,813 | Australia | May 12, 1955 |